United States Patent [19]

Chum et al.

[11] Patent Number: 5,685,128

[45] Date of Patent: *Nov. 11, 1997

[54] METHOD OF PACKAGING FOOD PRODUCTS

[75] Inventors: Pak-Wing Steve Chum; Nicole F. Whiteman, both of Lake Jackson, Tex.

[73] Assignee: The Dow Chemical Company, Midland, Mich.

[*] Notice: The term of this patent shall not extend beyond the expiration date of Pat. No. 5,272,236.

[21] Appl. No.: 455,176

[22] Filed: May 31, 1995

Related U.S. Application Data

[60] Division of Ser. No. 54,334, Apr. 28, 1993, Pat. No. 5,427,807, which is a continuation-in-part of Ser. No. 776,130, Oct. 15, 1991, Pat. No. 5,272,236.

[51] Int. Cl.$^6$ ............................................. B65B 53/00
[52] U.S. Cl. ......................... 53/441; 426/106; 426/415
[58] Field of Search ............................. 426/106, 124, 426/125, 415; 53/441

[56] References Cited

U.S. PATENT DOCUMENTS

| | | | |
|---|---|---|---|
| 3,456,044 | 7/1969 | Pahlke | 264/25 |
| 3,491,073 | 1/1970 | Marinak . | |
| 3,645,992 | 2/1972 | Elston . | |
| 4,076,698 | 2/1978 | Anderson et al. | 526/348.6 |
| 4,205,021 | 5/1980 | Morita et al. . | |
| 4,352,849 | 10/1982 | Mueller | 428/213 |
| 4,405,774 | 9/1983 | Miwa et al. . | |
| 4,486,552 | 12/1984 | Niemann | 523/169 |
| 4,503,102 | 3/1985 | Mollison | 428/35 |
| 4,510,303 | 4/1985 | Oda et al. . | |
| 4,521,437 | 6/1985 | Storms | 426/130 |
| 4,530,914 | 7/1985 | Ewen et al. . | |
| 4,668,752 | 5/1987 | Tominari et al. . | |
| 4,798,081 | 1/1989 | Hazlitt et al. | 73/53 |
| 4,820,557 | 4/1989 | Warren | 428/34.9 |
| 4,835,194 | 5/1989 | Bright et al. | 523/169 |
| 4,837,084 | 6/1989 | Warren | 428/349 |
| 4,837,262 | 6/1989 | Jeon et al. | 524/322 |
| 4,865,902 | 9/1989 | Golike et al. | 428/215 |
| 4,927,708 | 5/1990 | Herran et al. | 428/332 |
| 4,935,474 | 6/1990 | Ewen et al . | |
| 4,937,299 | 6/1990 | Ewen et al. . | |
| 4,952,451 | 8/1990 | Mueller | 428/218 |
| 4,963,419 | 10/1990 | Lustig et al. | 428/36.7 |
| 4,987,212 | 1/1991 | Morterol et al. . | |
| 5,006,398 | 4/1991 | Banerji | 428/220 |
| 5,026,798 | 6/1991 | Canich . | |
| 5,055,438 | 10/1991 | Canich . | |
| 5,064,802 | 11/1991 | Stevens et al. | 502/155 |
| 5,084,540 | 1/1992 | Albizzati et al. . | |
| 5,089,321 | 2/1992 | Chum et al. | 428/218 |
| 5,112,674 | 5/1992 | German et al. | 428/216 |
| 5,143,968 | 9/1992 | Diehl et al. | 524/534 |
| 5,185,203 | 2/1993 | Itaba et al. | 428/343 |
| 5,218,071 | 6/1993 | Tsutsui et al. | 526/348 |

FOREIGN PATENT DOCUMENTS

| | | | |
|---|---|---|---|
| 2008315 | 7/1990 | Canada | C08F 4/16 |
| 0243965 | 11/1987 | European Pat. Off. | B32B 7/02 |
| 0333508 | 9/1989 | European Pat. Off. | C08L 23/04 |
| 0404969 | 1/1991 | European Pat. Off. | B32B 27/32 |
| 0 416 815 A2 | 3/1991 | European Pat. Off. | C08F 10/00 |
| 0416815 A2 | 3/1991 | European Pat. Off. . | |
| 0 416 651 A1 | 1/1992 | European Pat. Off. | C08F 4/74 |
| 2123747 | 2/1984 | United Kingdom | B32B 27/08 |
| WO 9003414 | 4/1990 | WIPO . | |
| WO91/06426 | 5/1991 | WIPO | B32B 27/32 |

OTHER PUBLICATIONS

*The Wiley Encyclopedia of Packaging Technology*, John Wiley & Sons, Marilyn Bakker, 1986, pp. 48–49, 218–220, and 329–341.

*Advances in Polyolefins*, by R.B. Seymour and T. Cheng, (1987) pp. 373–380 "Crystallinity and Morphology of Ethylene/α–Olefin Copolymers" by P. Schouterden, G. Groeninckx, and H. Reynaers.

*Advances in Polyolefins*, by R.B. Seymour and T. Cheng, (1987) "New Catalysis and Process for Ethylene Polymerization" pp. 337–354, by F. Karol, B. Wagner, I. Levine, G. Goeke, and A. Noshay.

*Advances in Polyolefins*, by R.B. Seymour and T. Cheng, (1987) "Polymerization of Olefins with a Homogeeous Zirconium/Aluminoxane Catalyst" pp. 361–371 by W. Kaminsky and H. Hahnsen.

Journal of Polymer Science, Part A, vol. 1 (pp. 2869–2880) (1963), "Long–Chain Branching Frequency in Polyethylene" by J.E. Guillet.

Polymer Preprints, Amer. Chem. Society, vol. 12, No. 1, pp. 277–281 (Mar. 1971), "Evidence of Long–Chain Branching in High Density Polyethylene" by E.E. Drott & R.A. Mendelson.

*Journal of the American Chemical Society*, 98–7, pp. 1729–1742 (Mar. 31, 1976) "Structure and Chemistry of Bis(cyclopentadienyl)–MLn Complexes" by Joseph W. Lauher and Ronald Hoffman.

*Polymer Engineering and Science*, vol. 16, No. 12, pp. 811–816 (Dec. 1976) "Influence of Long Chain Branching on the Viscoelastic Properties of Low–Density Polyethylenes" by L. Wild, R. Ranganath, and D. Knobeloch.

(List continued on next page.)

*Primary Examiner*—David W. Wu

[57] ABSTRACT

Food products, especially fresh food products such as retail-cut red meat, vegetables and fruits, are packaged with a film having at least one film layer comprising a substantially linear ethylene polymer, preferably a polymer comprising ethylene and at least one α-olefin comonomer, e.g. 1-octene. The ethylene polymers used in the construction of the film structures used in this invention are prepared by constrained geometry catalyst technology. The film structures can be either mono- or multilayered, oriented or nonoriented, oxygen permeable or impermeable, and prepared by any conventional technique. The food products can be packaged by any conventional method, e.g. stretch overwrap, shrink, vacuum skin, on vacuum forming.

10 Claims, 7 Drawing Sheets
(1 of 8 Drawing(s) in Color)

OTHER PUBLICATIONS

*Angew. Chem. Int. Ed. Engl.* pp. 630–632 (1976) vol. 15, No. 10, "Halogen Free Soluble Ziegler Catalysts for the Polymerization of Ethylene. Control of Molecular Weight by Choice of Temperature" by Arne Andresen et al.

*Advances in Organometallic Chemistry,* pp. 99–148, vol. 18, (1980) "Ziegler–Natta Catalysis" by Hansjorg Sinn and Walter Kaminsky.

*Angew. Chem. Int. Ed. Engl.,* pp. 390–393, vol. 19, No. 5, (1980) "Living Polymers on Polymerization with Extremely Productive Ziegler Catlysts" by Hansjorg Sinn, Walter Kaminsky, Hans–Jurgen Vollmer, and Rudiger Woldt.

*Polymer Bulletin,* vol. 9, pp. 464–469 (1983) "Halogen Free Soluble Ziegler Catalysts with Methylalumoxan as Catalyst" by Jens Herwig and Walter Kaminsky.

*Makromol. Chem. Rapid Commun.,* vol. 4, pp. 417–421 (1983) "Bis(Cyclopentadienyl)zirkon–Verbingungen und Aluminoxan als Ziegler–Katalysatoren fur die Polymerisation und copolymerisation von Olefinen" by Walter Kaminsky et al.

*Antec Proceedings,* pp. 306–309 (1983), "Analysis of Long Chain Branching in High Density Polyethylene" by J.K. Hughes.

*Makromol. Chem. Rapid Commun.,* vol. 5, pp. 225–228 (1984) "Influence of hydrogen on the polymerization of ethylene with the homogeneous Ziegler system bis(cyclopentadienyl) zirconiumdichloride/aluminoxane" by Walter Kaminsky et al.

*Journal of Polymer Science, Polymer Chemistry Edition,* vol. 23, pp. 2117–2133 (1985) "Homogeneous Ziegler Natta Catalysis. 11. Ethylene Polymerization by IVB Transition Metal Complexes/Methyl Aluminoxane Catalyst Systems" by E. Giannetti and R. Mazzocchi.

*Journal of Applied Polymer Science,* vol. 30, pp. 3751–3765 (1985) "On the Effects of Very Low Levels of Long Chain Branching on Rheological Behavior in Polyethylene" by B.H. Bersted.

*Journal of Polymer Science: Polymer Chemistry Edition,* vol. 23, pp. 2151–2164 (1985) "Ethylene Propylene Diene Terpolymers Produced with a Homogeneous and Highly Active Zirconium Catalyst" by Walter Kaminsky et al.

*The Society of Rheology,* vol. 30, pp. 337–357, (1986) "Wall Slip in Viscous Fluids and the Influence of Materials of Construction", by A.V. Ramamurthy.

*Makromol. Chem. Macromol. Symp,* vol. 4, pp. 103–118, (1986) "Elastomers by Atactic Linkage of α–Olefins Using Soluble Ziegler Catalysts" by W. Kaminsky and M. Schlobohm.

*Journal of Rheology,* vol. 31, No. 8, pp. 815–834 (1987) "Wall Slip and Extrudate Distortion in Linear Low Density Polyethylene" by D. Kalika and M. Denn.

*Makromol. Chem.* vol. 190, pp. 515–526 (1989) "Copolymerization of Cycloalkenes with Ethylene in Presence of Chiral Zirconocene Catalysts" by W. Kaminsky and R. Spiehl.

*Journal of Macromolecular Science: Reviews in Macromolecular Chemistry and Physics,* C29 (2 & 3), pp. 201, 303 (1989) "A Review of High Resolution Liquid[13]Carbon Nuclear Magnetic Resonance Characterizations of Ethylene Based Polymers".

*Journal of Non–Newtonian Fluid Mechanics,* 36, pp. 255–263 (1990) "Additional Observations on the Surface Melt Fracture Behavior of Linear Low Density Polyethylene": by R. Moynihan, D. Baird, and R. Ramanathan.

*Makromol. Chem. Rapid Commun.,* pp. 89–94 (1990) "Terpolymers of Ethylene, Propene and 1,5–Hexadiene Synthesized with Zirconocene/Methylaluminoxane" by W. Kaminsky and H. Drogemuller.

*Journal of Rheology,* 35 (4),3 (May 1991) pp. 497–520 "Wall Slip of Molten High Dnsity Polyethylene. I. Sliding Plate Rheometer Studies" by S.G. Hatzikiriakos and J.M. Dealy.

*Proceedings of the 1991 IEEE Power Engineering Society,* pp. 184–190 (Sep. 22–27, 1991), "New Specialty Linear Polymers (SLP) for Power Cables" by Monica Hendewerk and Lawrence Spenadel.

*Society of Plastic Engineers Proceedings,* Polyolefins VII International Conference, Feb. 24–27, 1991, "Structure/ Property Relationships in Exxpol™ Polymers" by C. Speed, B. Trudell, A. Mehta, and F. Stehling.

*1991 Specialty Polyolefins Conference Proceedings,* "The Marketing Challenge Created by Single Site Catalysts in Polyolefins" Sep. 24, 1991, pp. 41–45 by Michael P. Jeffries.

*1991 Polymers, Laminations, & Coatings Conference,* TAPPI Proceedings, presented in Feb., 1991, pp. 289–296, "A New Family of Linear Ethylene Polymers with Enhanced Sealing Performance" by D. Van der Sanden and R. W. Halle.

*Society of Plastic Engineers 1991 Sepcialty Polyolefins Conference Proceedings,* pp. 41–45, "The Marketing Challenge Created by Single Site Catalysts in Polyolefins" by M. Jefferies (Sep. 24, 1991).

*Polymer Engineering and Science,* vo. 17, No. 11, p. 770 (1970).

"Rheometers for Molten Plastics" by John Dealy, published by Van Nostrand Reinhold Co. (1982), pp. 97–99.

*Journal of Rheology,* 30(2), 337–357 (1986) by Ramaurthy.

*Journal of Polymer Science, Polymer Physics Ed.,* vol. 20, p. 441 (1982).

*Encyclopedia of Chemical Technology,* Kirk–Othmer, 3rd Ed., John Wiley & Sons, New York (1981) vol. 16, pp. 416–417 and vol. 18, pp. 191–192.

*Packaging Foods with Plastics* by Jenkins and Harrington (1991), pp. 19–27 and 78–83.

*Film Extrusion Manual: Process, Materials, Properties,* pp. 31–80 (1992), "Coextrusion Basics" by Thomas I. Butler, published by TAPPI Press.

*Society of Plastics Engineers RETC Proceedings,* Jun. 15–17, 1981, pp. 211–229, "Coextrusion for Barrier Packaging" by Schrenk and Finch.

"Plastic Films, Technology and Packaging Applications" (1992) by Technomic Publishing Co., Inc.

*Converting Magazine,* Sep. 1992, "Laminations vs. Coextrusions" by Dumbleton.

*Packaging Machinery Manufacturers Institute,* Apr. 1982, "Packaging Machinery Operations: No. 8, Form–Fill–Sealing, A Self–Instructional Course" by Davis.

*The Wiley Encyclopedia of Packaging Technology,* M. Bakker (Editor), John Wiley & Sons (1986), pp. 334, 364–369.

*Packaging: An Introduction* by Sacharow and Brody; Harcourt Bruce Javanovich Publications, Inc. (1987) pp. 322–326.

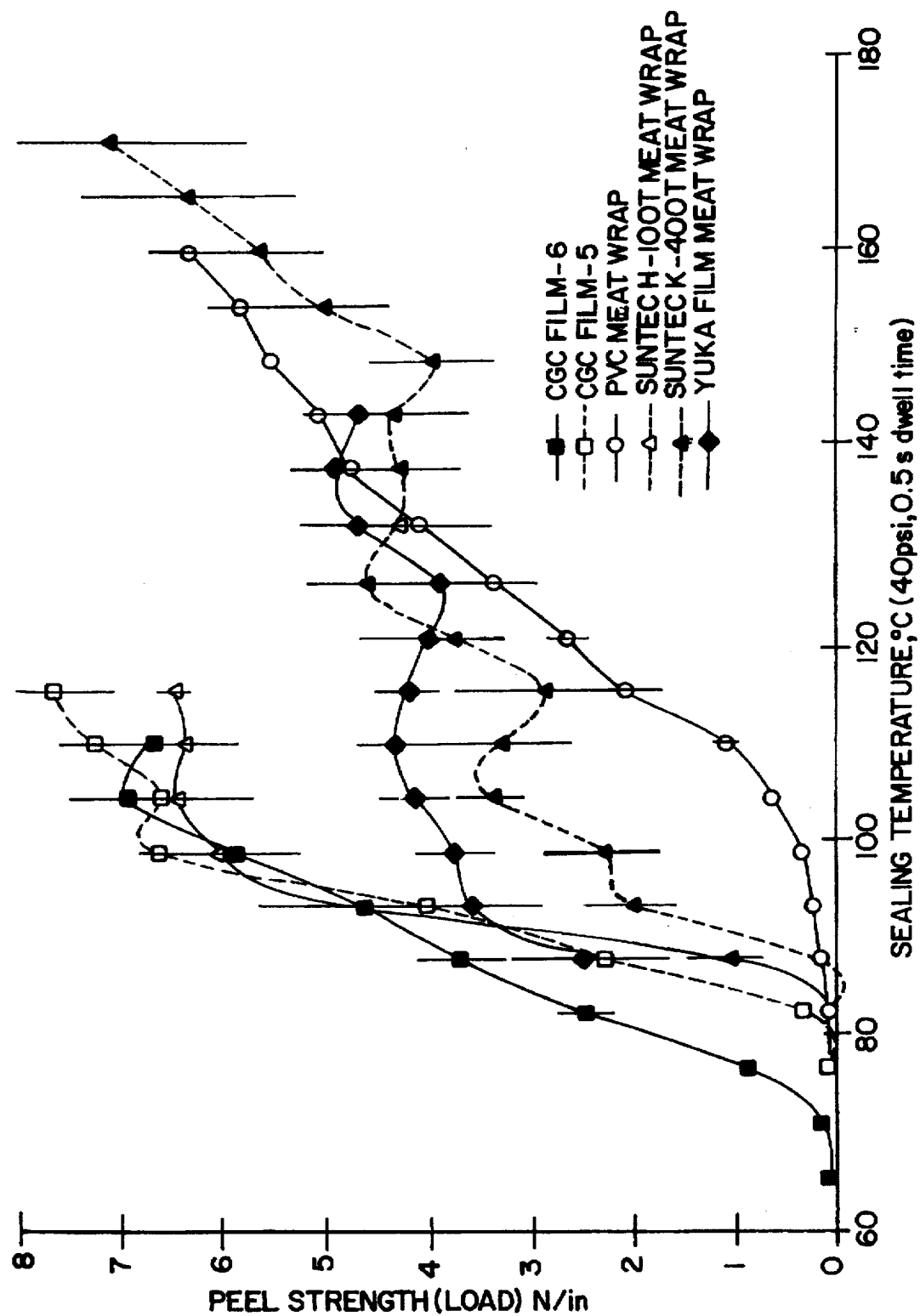

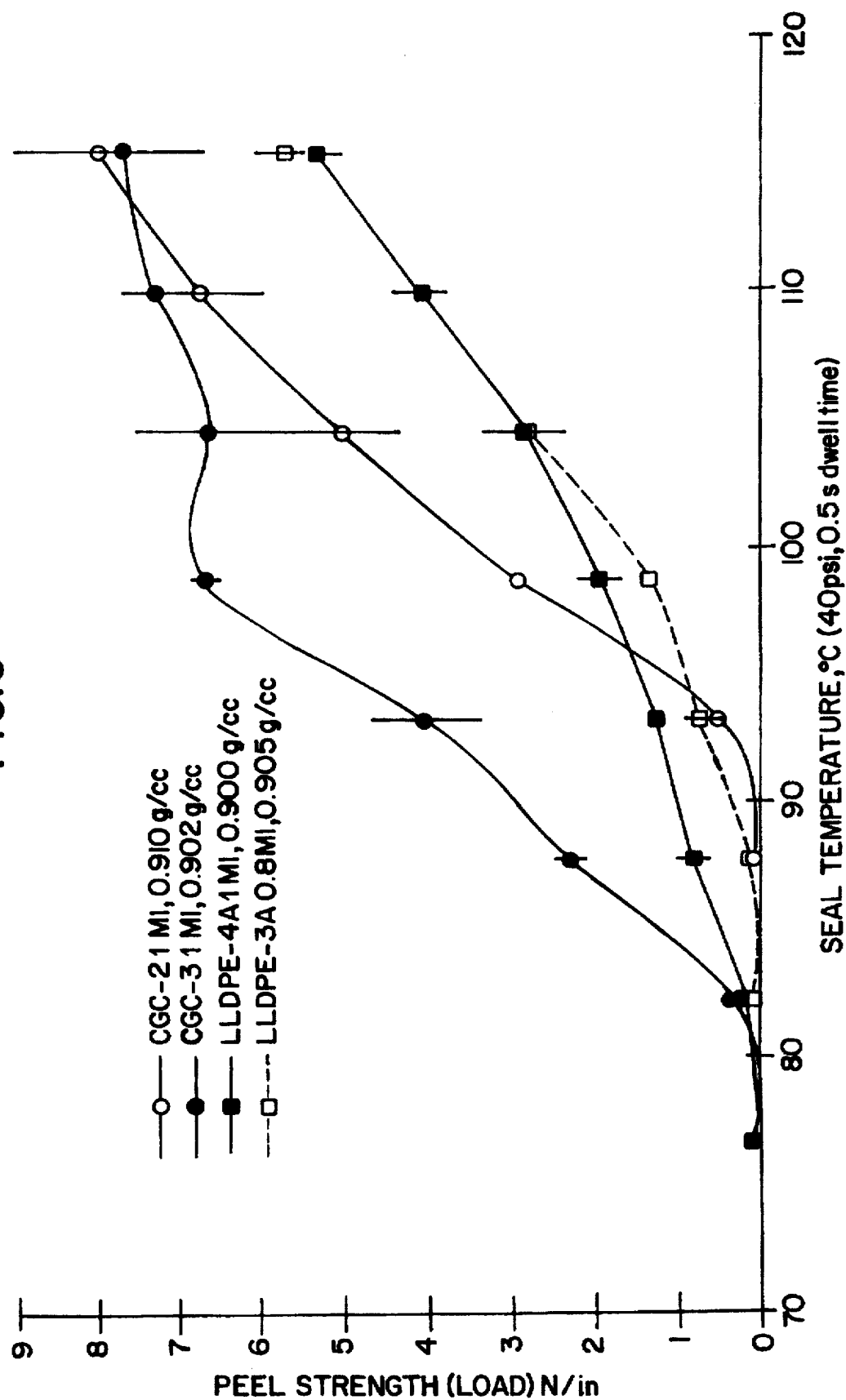

METHOD OF PACKAGING FOOD PRODUCTS

CROSS-REFERENCE TO RELATED APPLICATIONS

This application is a divisional of U.S. Ser. No. 08/054,334 filed Apr. 28, 1993, now U.S. Pat. No. 5,427,807, which is a continuation-in-part of U.S. Ser. No. 07/776,130 filed Oct. 15, 1991, now U.S. Pat. No. 5,272,236, the disclosures of which are incorporated herein by reference.

This application is also related to U.S. Pat. No. 5,278,272; U.S. application Ser. No. 07/961,269 filed Oct. 14, 1992; U.S. application Ser. No. 08/024,563 filed Mar. 1, 1993, abandoned; and allowed U.S. Ser. No. 08/055,063 filed Apr. 28, 1993 now U.S. Pat. No. 5,562,958, all of which are incorporated herein by reference.

BACKGROUND OF THE INVENTION

This invention relates to the packaging of food. In one aspect, this invention relates to the packaging of fresh foods, e.g. retail-cut red meats, while in another aspect, this invention relates to packaging food with a plastic film. In yet another aspect, this invention relates to packaging food with a film structure having at least one film layer comprising a substantially linear ethylene polymer.

In the modern distribution and marketing of food products, a multitude of different packaging materials are used. One principal category of food packaging materials is plastic film. Many different kinds of plastic film exist, both in composition and structure, and some are tailored to specific applications while others are more generic in nature.

Currently, polyvinyl chloride (PVC) film is the predominate plastic film used to wrap retail-cut red meat and similar products, e.g. fresh fish, poultry, vegetables, fruits, etc., due to its many desirable properties and its low cost relative to other plastic films. Representative of these desirable properties are clarity, oxygen transmission, flexibility, toughness, heat sealability, elastic recovery, and processability. However, most PVC films include a plasticizer to obtain the desired flexibility, and a growing concern exists as to the carcinogenic properties of the most commonly used PVC film plasticizer and the tendency of this plasticizer to migrate from the film to the food product. On a more fundamental level, a growing concern also exists regarding the use in food wrapping applications of any plastic film comprising one or more chlorinated polymers. The concern is based on the tendency for chlorinated polymers to yield corrosive acid when thermally degraded or incinerated, as well as concern regarding the general difficulty involved in recycling chlorinated polymers.

In the search for alternatives to PVC film, various monolayer olefin films, particularly polyethylene films, have been considered but none have been found to be without at least one major flaw that has blocked its commercial acceptability. High density polyethylene (HDPE) is much too inelastic to be useful as a commercial wrap, while the various low density polyethylenes, e.g. low density polyethylene (LDPE), linear low density polyethylene (LLDPE), ultra low density polyethylene (ULDPE), etc., do not possess sufficient elastic recovery, and the film retains impressions or dents caused by handling of the packaged goods by potential purchasers while inspecting its contents. This can be detrimental to the sale value of the food product because the wrapped product will quickly lose its pristine appearance which in turn may cause subsequent potential buyers to intentionally avoid a perfectly good product that now has the appearance of one repeatedly rejected by earlier potential purchasers. The use of nontoxic plasticizers, such as corn oil, has not proven totally satisfactory, particularly with respect to their temperature stability.

Various multilayer films have also been considered (e.g. those taught in U.S. Pat. No. 5,112,674 and in EPO 0 243 965, EPO 0 333 508, and EPO 0 404 969), and significant among these are films made by co-extrusion of polyethylene with an ethylene/$\alpha,\beta$-ethylenically unsaturated carbonyl copolymer, such as ethylene vinyl acetate (EVA) or ethylene acrylic acid (EAA). While these films demonstrate an elastic recovery similar to PVC film, EVA and EAA are relatively expensive copolymers. Moreover, ethylene/$\alpha,\beta$-ethylenically unsaturated carbonyl copolymers are relatively difficult to fabricate, have a tendency to impart an offensive taste and/or odor to the food product, and are known to interfere with anti-fogging agents.

In other food wrap applications, other properties may have importance. For example, in the wrapping of primal cuts of meat (i.e., whole or sectioned carcasses of beef, pork, etc.) for long-distance shipping or long-term storage, shrink and oxygen impermeability are important properties. Consequently, these film are often multilayer structures comprising at least one oxygen barrier, e.g. SARAN (trademark of The Dow Chemical Company for a vinyl chloride—vinylidene chloride copolymer), sandwiched between two layers of a material with good shrink and abuse properties, e.g. LLDPE. In the packaging of foods using form-fill-seal technology, hot tack is an important property and, accordingly, multilayer film structures with at least one skin layer comprising LLDPE or ionomer as a hot tack heat seal layer. The other film layers impart the desired properties relative to the food to be packaged, e.g. SARAN for an oxygen barrier, PVC for elastic recovery, etc.

SUMMARY OF THE INVENTION

According to this invention, food products are packaged with a film structure having at least one film layer comprising a substantially linear ethylene polymer.

In one embodiment of this invention, food products, e.g. retail-cut red meats, are packaged with a film structure adapted for and used as a stretch overwrap. In another embodiment, food products, e.g. primal-cut red meats, are packaged with a film structure adapted for and used as a shrink wrap. In another embodiment, food products, e.g. case-ready meat cuts, are packaged with a film structure adapted for and used as a vacuum skin wrap. In yet another embodiment, food products, e.g. processed meats and cheeses, are packaged with a film structure adapted for and used as a vacuum form wrap.

The film structures used in the method of this invention can be mono- or multilayered, oriented or non-oriented, and irradiated or nonirradiated. These films can be prepared by any conventional process, and their properties designed to accommodate any particular end use. For example, in those applications requiring an oxygen barrier, the film structure can include a layer of SARAN film.

Food products packaged by the method of this invention demonstrate excellent shelf-life and exhibit a desirable commercial appearance. As here used, "packaged" and like terms mean that the food is wrapped or enclosed by the film structure in a manner such that the structure provides a barrier between the food and the environment. In some applications, the packaged food includes one or more components other than the food and film structure, e.g. paperboard in vacuum skin packaging, polystyrene or pulp trays in stretch overwrap packaging, an inert gas in vacuum form packaging, etc.

BRIEF DESCRIPTION OF THE DRAWINGS

The file of this patent contains at least one drawing executed om color. Copies of this patent with color drawing (s) will be provided by the Patent and Trademark Office upon request and payment of the necessary fee.

FIGS. 5 and 6 report the comparative heat seal properties of certain commercial films and films of this invention.

DESCRIPTION OF THE PREFERRED EMBODIMENTS

Figure 1:
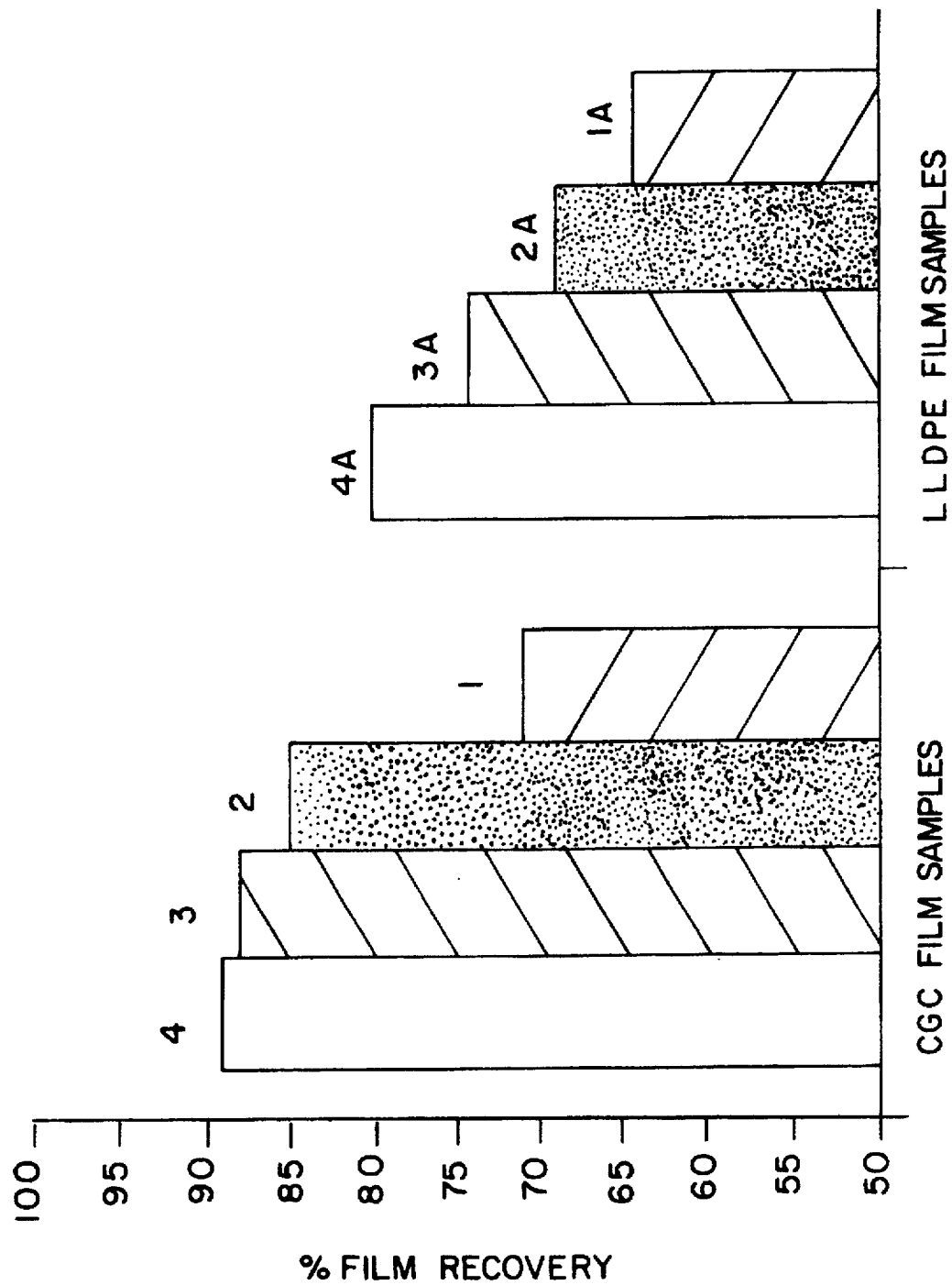
FIGS. 1 and 2 report the comparative percent recovery of certain films at 50% and 25% film elongation, respectively.

The substantially linear ethylene polymers used in the construction of the plastic films of this invention are known, and they and their method of preparation are fully described in U.S. Pat. No. 5,272,236 and U.S. Pat. No. 5,278,272, both of which are incorporated in their entirety into and made a part of this application. As here used, "substantially linear" means that the polymer backbone is substituted with about 0.01 long-chain branches/1000 carbons to about 3 long-chain branches/1000 carbons, preferably from about 0.01 long-chain branches/1000 carbons to about 1 long-chain branch/1000 carbons, and more preferably from about 0.05 long-chain branches/1000 carbons to about 1 long-chain branch/1000 carbons. Long-chain branching is here defined as a chain length of at least about 6 carbon atoms, above which the length cannot be distinguished using $^{13}C$ nuclear magnetic resonance spectroscopy, yet the long-chain branch can be about the same length as the length of the polymer backbone.

These unique polymers (subsequently referred to as "substantially linear ethylene polymers") are prepared by using constrained geometry catalysts (CGC), and are characterized by a narrow molecular weight distribution and if an interpolymer, by a narrow comonomer distribution. As here used, "interpolymer" means a polymer of two or more comonomers, e.g. a copolymer, terpolymer, etc. Other basic characteristics of these substantially linear ethylene polymers include a low residuals content (i.e. low concentrations in the substantially linear ethylene polymer of the catalyst used to prepare the polymer, unreacted comonomers, if any, and low molecular weight oligomers made during the course of the polymerization), and a controlled molecular architecture which provides good processability even though the molecular weight distribution is narrow relative to conventional olefin polymers.

While the substantially linear ethylene polymers used in the practice of this invention include substantially linear ethylene homopolymers, preferably these substantially linear ethylene polymers comprise between about 95 and 50 wt % ethylene, and about 5 and 50 wt % of at least one α-olefin comonomer, more preferably 10 to 25 wt % of at least one α-olefin comonomer. Percent comonomer is measured by Infrared Spectroscopy according to ASTM D-2238 Method B. Typically, the substantially linear ethylene polymers are copolymers of ethylene and an α-olefin of 3 to about 20 carbon atoms (e.g. propylene, 1-butene, 1-hexene, 4-methyl-1-pentene, 1-heptene, 1-octene, styrene, etc.), with a density of 0.850 to about 0.960 grams per cubic centimeter (g/cm$^3$), preferably of 0.870 to about 0.910 g/cm$^3$. The melt flow ratio, measured as $I_{10}/I_2$ (ASTM D-1238), is greater than or equal to 5.63, and is preferably from about 6.5 to 15, more preferably from about 7 to 10. The molecular weight distribution ($M_w/M_n$), measured by gel permeation chromatography (GPC), is defined by the equation:

$$M_w/M_n \leq (I_{10}/I_2) - 4.63,$$

and is preferably between about 1.5 and 2.5. For the substantially linear ethylene polymers, the $I_{10}/I_2$ ratio indicates the degree of long-chain branching, i.e. the larger the $I_{10}/I_2$ ratio, the more long-chain branching in the polymer.

The "rheological processing index" (PI) is the apparent viscosity (in kpoise) of a polymer measured by a gas extrusion rheometer (GER). The gas extrusion rheometer is described by M. Shida, R. N. Shroff and L. V. Cancio in *Polymer Engineering Science*, Vol. 17, No. 11, p. 770 (1977), and in "Rheometers for Molten Plastics" by John Dealy, published by Van Nostrand Reinhold Co. (1982) on pp. 97–99, both publications of which are incorporated by reference herein in their entirety. GER experiments are performed at a temperature of 190° C., at nitrogen pressures between 250 to 5500 psig using about a 7.54 cm diameter, 20:1 L/D die with an entrance angle of 180°. For the substantially linear ethylene polymers described herein, the PI is the apparent viscosity (in kpoise) of a material measured by GER at an apparent shear stress of $2.15 \times 10^6$ dyne/cm$^2$. The novel substantially linear ethylene interpolymers and homopolymers described herein preferably have a PI in the range of about 0.01 kpoise to about 50 kpoise, preferably about 15 kpoise or less. The novel substantially linear substantially linear ethylene interpolymers and homopolymers described herein have a PI less than or equal to about 70% of the PI of a comparative linear ethylene polymer (either a Ziegler polymerized polymer or a linear uniformly branched polymer as described by Elston in U.S. Pat. No. 3,645,992) at about the same $I_2$ and $M_w/M_n$.

An apparent shear stress versus apparent shear rate plot is used to identify the melt fracture phenomena. According to Ramamurthy in the *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." In this disclosure, the onset of surface melt fracture (OSMF) is characterized at the beginning of losing extrudate gloss at which the surface roughness of the extrudate can only be detected by 40× magnification. The critical shear rate at the onset of surface melt fracture for the substantially linear ethylene interpolymers and homopolymers is at least 50 percent greater than the critical shear rate at the onset of surface melt fracture of a comparative linear ethylene polymer (either a Ziegler polymerized polymer or a linear uniformly branched polymer as described by Elston in U.S. Pat. No. 3,645,992) having about the same $I_2$ and $M_w/M_n$.

Gross melt fracture occurs at unsteady extrusion flow conditions and ranges in detail from regular (alternating rough and smooth, helical, etc.) to random distortions. For commercial acceptability, (e.g., in blown films and bags therefrom), surface defects should be minimal, if not absent, for good film quality and properties. The critical shear stress at the onset of gross melt fracture for the substantially linear ethylene interpolymers and homopolymers used in making the biaxially oriented, heat-shrinkable film of the present invention is greater than about $4 \times 10^6$ dynes/cm$^2$. The critical shear rate at the onset of surface melt fracture (OSMF) and the onset of gross melt fracture (OGMF) will be used herein based on the changes of surface roughness and configurations of the extrudates extruded by a GER.

The distribution of comonomer branches for the substantially linear ethylene interpolymers and homopolymers is characterized by its SCBDI (Short Chain Branch Distribution Index) or CDBI (Composition Distribution Branch Index) and is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, by Wild et al., *Journal of Polymer Science, Poly. Phys. Ed.*, Vol. 20, p. 441 (1982), or in U.S. Pat. No. 4,798,081, both disclosures of which are incorporated herein by reference. The SCBDI or CDBI for the substantially linear interpolymers and homopolymers of the present invention is preferably greater than about 30 percent, especially greater than about 50 percent.

The unique characteristic of the homogeneously branched, substantially linear ethylene polymers is a highly unexpected flow property where the $I_{10}/I_2$ value of the polymer is essentially independent of the polydispersity index (i.e., $M_w/M_n$) of the polymer. This is contrasted with conventional linear homogeneously branched and linear heterogeneously branched polyethylene resins having rheological properties such that to increase the $I_{10}/I_2$ value the polydispersity index must also be increased.

The preferred melt index, measured as $I_2$ (ASTMD-1238, condition 190/2.16 (formerly condition E)), is from about 0.5 g/10 min to 20 g/10 min, more preferably 1 to 5 g/10 min. Typically, the preferred substantially linear ethylene polymers used in the construction of the plastic films used in this practice of this invention are homogeneously branched and do not have any measurable high density fraction, (i.e. short chain branching distribution as measured by Temperature Rising Elution Fractionation which is described in U.S. Pat. No. 5,089,321, and which is incorporated in its entirety into and made a part of this application), e.g. they do not contain any polymer fraction that has a degree of branching less than or equal to 2 methyl/1000 carbons. These preferred substantially linear ethylene polymers have a single differential scanning calorimetry (DSC) melting peak.

The film structure and the substantially linear ethylene polymer selected for use in the practice of this invention will depend in large part upon the particulars of the method used to package the food, e.g. the preferred properties of a film used in a shrink wrap method are different than the preferred properties of a film used in a stretch overwrap method. The film structure can be monolayer film on a multilayer film in which one or more film layers comprises at least one substantially linear ethylene polymer.

In those embodiments in which the film structure is a monolayer, the film is made of a substantially linear ethylene polymer or substantially linear ethylene polymer blend or a thermoplastic polymer blend comprising at least about 50 wt %, preferably at least about 75 wt %, of at least one substantially linear ethylene polymer, with the remainder being a natural or synthetic thermoplastic polymer(s). If a blend of one or more substantially linear ethylene polymers and one or more non-substantially linear ethylene polymers (e.g. conventional, homogeneously branched linear ethylene/α-olefin copolymers made as described in U.S. Pat. No. 3,645,992, or conventional, heterogeneously branched ethylene/α-olefin copolymers made by the Ziegler process as described in U.S. Pat. No. 4,076,698, both disclosures of which are incorporated herein by reference) are used in the construction of the monolayer, then these non-substantially linear ethylene polymers are selected in part based on their compatibility with the substantially linear ethylene polymer (s).

If desired, e.g. for shrink wrap applications, the monolayer can be crosslinked by any conventional technique (e.g. by exposure to beta- or gamma-radiation) or biaxially oriented by any conventional technique (e.g. tenter framing, double or trapped bubble extrusion, etc.). The monolayer may also contain additives to impart to or enhance certain properties of the film, and these additives include fillers, antioxidants, antifogging agents (such as those taught in U.S. Pat. Nos. 4,835,194 and 4,486,552), plasticizers, tackifiers, etc.

Depending on their various properties, any of these monolayers can be used in any of the various packaging methods, e.g. stretch overwrap, shrink packaging, etc., but as a practical matter, monolayer films are best adapted for use in the stretch overwrap method. One particularly desirable polymer composition for making monolayer used in the stretch overwrap method is a blend of substantially linear ethylene polymer and an ethylene/α-β unsaturated carbonyl copolymer such as EVA, EAA, ethylene/methacrylic acid (EMAA), and their alkali metal salts (ionomers), esters and other derivatives. Blends of substantially linear ethylene polymer and EVA are especially preferred.

In those embodiments in which the film structure is multilayer, it can be of any conventional structure, e.g. 2-ply, 3-ply, 4-ply, 5-ply, 6-ply, 7-ply, etc. The structure will generally have an odd number of layers, and the film layer(s) comprising a substantially linear ethylene polymer can be one or both outer layers and/or one or more core layers. Those layer(s) constructed from polymer other than a substantially linear ethylene polymer can comprise any suitable material generally compatible with a film constructed from a substantially linear ethylene polymer, e.g. one or more conventional LDPE, LLDPE, ULDPE, EVA, EAA, and the like. Additives such as those described above with respect to monolayer films can also be used in these multilayer films, and these additives can be incorporated into any of the film layers as desired, e.g. tackifiers and slip agents into one or both outer layers, fillers in one or more core layers, etc.

Film structures having the novel properties attributable to using one or more substantially linear ethylene polymers for one or more layers can be made using conventional fabrication techniques, e.g. simple bubble extrusion (usually with a high blow-up ratio (BUR)), biaxial orientation processes (such as tenter frames or double bubble processes), simple cast/sheet extrusion, coextrusion, lamination, etc. Conventional simple bubble extrusion processes (also known as hot blown film processes) are described, for example, in *The Encyclopedia of Chemical Technology*, Kirk-Othmer, Third Edition, John Wiley & Sons, New York, 1981, Vol 16, pp. 416–417 and Vol. 18, pp. 191–192, the disclosures of which are incorporated herein by reference. Biaxial orientation film manufacturing processes such as described in the "double bubble" process of U.S. Pat. No. 5 3,456,044 (Pahlke), and the processes described in U.S. Pat. No. 4,352,849 (Mueller), U.S. Pat. Nos. 4,820,557 and 4,837,084 (both to Warren), U.S. Pat. No. 4,865,902 (Golike et al.), U.S. Pat.

No. 4,927,708 (Herran et al.), U.S. Pat. No. 4,952,451 (Mueller), and U.S. Pat. Nos. 4,963,419 and 5,059,481 (both to Lustig et al.), the disclosures of which are incorporated herein by reference, can also be used to make the novel film structures of this invention. Biaxially oriented film structures can also be made by a tenter-frame technique, such as that used for oriented polypropylene.

Other multilayer film manufacturing techniques for food packaging applications are described in *Packaging Foods With Plastics* by Wilmer A. Jenkins and James P. Harrington (1991), pp. 19–27, and in "Coextrusion Basics" by Thomas I. Butler, *Film Extrusion Manual: Process, Materials, Properties*, pp. 31–80 (published by TAPPI Press (1992)) the disclosures of which are incorporated herein by reference.

In certain embodiments of this invention, e.g. stretch overwrap applications, at least one heat sealable, preferably hot tackable, outer layer (i.e., skin layer) of the film structure comprises a substantially linear ethylene polymer. This heat sealable outer layer can be coextruded with the other layer(s) or the heat sealable outer layer can be laminated onto another layer(s) in a secondary operation, such as that described in *Packaging Foods With Plastics*, ibid, or that described in "Coextrusion For Barrier Packaging" by W. J. Schrenk and C. R. Finch, *Society of Plastics Engineers RETEC Proceedings*, Jun. 15–17 (1981), pp. 211–229, the disclosures of which are incorporated herein by reference. If a monolayer film is produced via tubular film (i.e., blown film techniques) or flat die (i.e. cast film) as described by K. R. Osborn and W. A. Jenkins in "Plastic Films, Technology and Packaging Applications" (Technomic Publishing Co., Inc. (1992)), the disclosures of which are incorporated herein by reference, then the sealant film must go through an additional post-extrusion step of adhesive or extrusion lamination to other packaging material layers to form a multilayer structure. If the sealant film is a coextrusion of two or more layers (also described by Osborn and Jenkins), the film may still be laminated to additional layers of packaging materials, depending on the other physical requirements of the final packaging film. "Laminations vs. Coextrusions" by D. Dumbleton (*Converting Magazine*, September 1992), the disclosure of which is incorporated herein by reference, also discusses lamination versus coextrusion. Monolayer and coextruded films can also go through other post-extrusion techniques, such as a biaxial orientation process and irradiation. With respect to irradiation, this technique can also precede extrusion by irradiating the pellets from which the film is to be fabricated prior to feeding the pellets into the extruder, this increases the melt tension of the extruded polymer film and enhances processability.

In other embodiments of this invention, the film layer comprising a substantially linear ethylene polymer is a core layer in a multilayer structure. Film structures of this nature are prepared in the same manner as those noted above in which the film layer comprising the substantially linear ethylene polymer is a skin layer.

Extrusion coating is yet another technique for producing multilayer packaging materials. Similar to cast film, extrusion coating is a flat die technique. A sealant can be extrusion coated onto a substrate either in the form of a monolayer or a coextruded extrudate.

In those embodiments in which the skin layer comprises a substantially linear ethylene polymer, the other layers of the multilayer structure typically include, but are not limited to, barrier layers and/or structural layers. These layers can be constructed from various materials, including substantially linear ethylene polymers, and some layers can be constructed of the same materials, e.g. some films can have the structure A/B/C/B/A. Representative, nonlimiting examples of the non-substantially linear ethylene materials are: metal foil, nylon, ethylene/vinyl alcohol (EVOH) copolymers, polyvinylidene chloride (PVDC), polyethylene terephthalate (PET), oriented polypropylene (OPP), ethylene/vinyl acetate (EVA) copolymers, ethylene/acrylic acid (EAA) copolymers, ethylene/methacrylic acid (EMAA) copolymers, LLDPE, HDPE, LDPE, nylon, graft adhesive polymers (e.g. maleic anhydride grafted polyethylene), paper and paperboard. Generally, the multilayer film structures comprise from 2 to about 7 layers.

The thickness of the multilayer structures is typically from about 1 mil to about 10 mils (total thickness). The sealant layer, if present, varies in thickness depending on whether it is produced via coextrusion or lamination of a monolayer or coextruded film to other packaging materials. In a coextrusion, the sealant layer is typically from about 0.1 to about 5 mils, preferably from about 0.3 to about 3 mils. In a laminated structure, the monolayer or coextruded sealant film is typically from about 0.5 to about 5 mils, preferably from about 1 to 3 mils. For a monolayer film, the thickness is typically between about 0.4 mil to about 5 mils, preferably between about 0.8 to about 1.5 mils.

The film structures of the invention can be made into packaging structures such as form-fill-seal structures or bag-in-box structures. For example, one such form-fill-seal operation is described in *Packaging Foods With Plastics*, ibid, pp. 78–83. Packages can also be formed from multilayer packaging roll stock by vertical or horizontal form-fill-seal packaging and thermoform-fill-seal packaging, as described in "Packaging Machinery Operations: No. 8, Form-Fill-Sealing, A Self-Instructional Course" by C. G. Davis, *Packaging Machinery Manufacturers Institute* (April 1982); *The Wiley Encyclopedia of Packaging Technology* by M. Bakker (Editor), John Wiley & Sons (1986), pp. 334, 364–369; and *Packaging: An Introduction* by S. Sacharow and A. L. Brody, Harcourt Brace Javanovich Publications, Inc. (1987), pp. 322–326. The disclosures of all of the preceding publications are incorporated herein by reference. A particularly useful device for form-fill-seal operations is the Hayssen Ultima Super CMB Vertical Form-Fill-Seal Machine. Other manufacturers of pouch thermoforming and evacuating equipment include Cryovac and Koch. A process for making a pouch with a vertical form-fill-seal machine is described generally in U.S. Pat. Nos. 4,503,102 and 4,521,437, both of which are incorporated herein by reference. Film structures containing one or more layers comprising a substantially linear ethylene polymer are well suited for the packaging of potable water, wine, condiments, and similar food products in such form-fill-seal structures.

In those film structures incorporating an antifogging agent, the core layer(s) preferably consists of a nonpolar, hydrophobic polymer, e.g. a substantially linear ethylene polymer. Antifogging agents are generally located in the skin layers of such a structure. These agents are hydrophilic materials that interact with water (either from the atmosphere relative to the skin layer most removed from the wrapped food, or from the food by way of evaporation relative to the skin layer in contact with the food) such that water droplets do not form on the surface of the skin layer (thus "fogging" the film). This fogging, particularly on the skin layer in contact with the food, results in reduced product visibility and shelf life, and thus reduced commercial value.

In those structures with a core layer having a polar, hydrophilic nature, e.g. a core layer comprising EAA or EVA, the antifogging agent tends to migrate toward it. This depletes the concentration of antifogging agent at the exposed surfaces of the outer layers, and this in turn renders the film more susceptible to fogging. In multilayer film structures without a polar, hydrophilic core layer, the antifogging agent remains relatively dispersed throughout the outer layers.

Notwithstanding this disadvantage relative to antifogging agents, some food wrapping applications may be better served if the one or more of the core layers are constructed from a polar, hydrophilic material and the outer layers are constructed from a nonpolar, hydrophobic material. One example of such a film structure is substantially linear ethylene-polymer/EAA/substantially linear ethylene-polymer which is useful in wrapping retail-cut red meat and similar food products.

Other desirable properties of the plastic films used in this invention include, depending on the nature of the other film layers in the structure, ease of fabrication and good oxygen permeability (particularly with respect to films made from such copolymers as EVA and EAA), oxygen impermeability (particularly with respect to films containing an oxygen barrier such as SARAN or ethylene vinyl alcohol), dart impact, puncture resistance, tensile strength, low modulus, tear resistance, shrinkability, high clarity and a low affect on the taste and odor properties of the packaged food.

In those embodiments which employ a sealant layer comprising a substantially linear ethylene polymer, preferably the sealant layer comprises only a substantially linear ethylene polymer. However, non-substantially linear ethylene polymers can be blended with the substantially linear ethylene polymer to modify the processing, strength, or heat seal characteristics of the sealant layer of the final film structure. Some useful polymer blend components include, for example, high pressure low density polyethylene (LDPE), EVA, polyisobutylene (PIB), and LLDPE. Preferably, the substantially linear ethylene polymers comprise at least about 20 wt %, more preferably at least about 50 wt %, of the sealant layer blend composition. Highly preferably, the sealant layer consists of substantially linear ethylene polymer.

The plastic films of this invention are well suited for stretch overwrap packaging various fresh foods, e.g. retail-cut red meats, fish, poultry, vegetables, fruits, cheeses, and other food products destined for retail display and that benefit from access to environmental oxygen. These films are preferably prepared as nonshrink films (e.g., without biaxial orientation induced by double bubble processing) with good oxygen permeability, stretch, elastic recovery and hot tack characteristics, and can be made available to wholesalers and retailers in any conventional form, e.g. stock rolls, and used on all conventional equipment.

Other plastic films of this invention can be used as shrink, skin and vacuum form packages for foods. The films comprising the shrink packages are typically biaxially oriented, exhibit low shrink tension, are of a density greater than about 0.89 g/cm³, and are typically about 0.6 to 2 mil in thickness. These film packages are used for, among other things, packaging primal-cut red meat and, as such, they are usually multilayered and contain an oxygen barrier (e.g., a SARAN film layer).

The film structures used in vacuum skin packaging can be multilayered, are typically about 5 to 12 mil in thickness, and the substantially linear ethylene polymer incorporated into the structure has a density of about 0.89 to 0.93 g/cm³. The vacuum skin packaging method typically involves a barrier film layer and it is particularly well-adapted for wrapping case-ready meats, i.e. meats prepared and packaged at a meat processor in a manner such that they are ready for immediate retail display and sale upon arrival at the market where optionally, the barrier film layer, if so designed, may be removed to allow the red meat to "bloom" to the desired bright red color.

Film structures used in vacuum form packaging methods usually exhibit good thermoformability and sealability (hot tack). These film structures are typically multilayered, and they typically contain an oxygen barrier. The structures are usually between about 1 and 4 mils in thickness, and the substantially linear ethylene polymer which is used in the manufacture of the structure is preferably of a density of between about 0.89 and 0.91 g/cm³. This packaging method often includes introducing an inert gas, e.g. nitrogen, one or more noble gases, etc, into the package, and is commonly used to wrap processed meats and cheeses.

The plastic films of this invention and their use as a food wrap are more fully described by the following examples. Unless indicated to the contrary, all parts and percentages are by weight.

SPECIFIC EMBODIMENTS

Substantially Linear Ethylene Copolymer Properties

Six homogeneously branched substantially linear ethylene copolymers of ethylene and 1-octene are prepared as described U.S. patent applications Ser. Nos. 07/776,130 and 07/939,281. The physical properties of these polymers are listed in Table 1.

TABLE 1

PHYSICAL PROPERTIES[1] OF SIX
substantially linear ethylene POLYMERS

| Sample | Density (g/cc) | Melt Index ($I_2$) | Melt Flow Ratio ($I_{10}/I_2$) | MWD[2] ($M_w/M_n$) |
|---|---|---|---|---|
| substantially linear | 0.920 | ethylene-1 1.0 | 9.25 | 2.1 |
| substantially linear | 0.910 | ethylene-2 1.0 | 7.85 | 2.1 |
| substantially linear | 0.902 | ethylene-3 1.0 | 7.25 | 2.2 |
| substantially linear | 0.880 | ethylene-4 0.7 | 7.10 | 2.1 |
| substantially linear | 0.900 | ethylene-5 1.0 | 7.30 | 2.2 |
| substantially linear | 0.900 | ethylene-6 2.0 | 7.25 | 2.1 |

[1]Each sample has a high density fraction of zero, as measured by the TREF Method described in USP 5,089,321, and only one DSC melting peak.
[2]MWD = Molecular Weight Distribution LLDPE Copolymer Properties Four LLDPE comparative, heterogeneously branched copolymers of ethylene and 1-octene are prepared by conventional techniques using a Ziegler catalyst. The heterogeneously branched copolymers have a broad branching distribution as compared with the substantially linear ethylene polymers used in the practice of the invention. The physical properties of these copolymers are listed in Table 2.

TABLE 2

PHYSICAL PROPERTIES OF FOUR
1-OCTENE LLDPE COPOLYMERS[3]

| Sample | Density (g/cc) | Melt Index ($I_2$) | Melt Flow Ratio ($I_{10}/I_2$) | MWD[4] ($M_w/M_n$) | High Density Fraction[5] |
|---|---|---|---|---|---|
| LLDPE-1 | 0.920 | 1.0 | 8.0 | 4.2 | 19 |
| LLDPE-2 | 0.912 | 1.0 | 8.2 | 4.3 | 21 |

TABLE 2-continued

PHYSICAL PROPERTIES OF FOUR 1-OCTENE LLDPE COPOLYMERS[3]

| Sample | Density (g/cc) | Melt Index ($I_2$) | Melt Flow Ratio ($I_{10}/I_2$) | MWD[4] ($M_w/M_n$) | High Density Fraction[5] |
|---|---|---|---|---|---|
| LLDPE-3 | 0.905 | 0.8 | 8.7 | 5.0 | 22 |
| LLDPE-4 | 0.900 | 1.0 | 9.2 | 5.2 | 20 |

[3]Each sample also has three DSC melting peaks.
[4]Molecular Weight Distribution.
[5]High Density Fraction as measured in weight percent according to the TREF method described in USP 5,089,321.

Film Fabrication

Blown film (1 mil thick) products of each substantially linear ethylene and conventional copolymer LLDPE are produced at a blow-up ratio of 2.5 in a Blown Film line equipped with a 3" die and a 2" screw at conditions similar to those described in Example 3 of U.S. Pat. No. 5,089,321.

EXAMPLE 1

Comparison of Elastic Recovery Properties

The elastic recovery, an important property in stretch overwrap applications, of the film samples made from the homogeneous ethylene/1-octene copolymers and the conventional LLDPE's are evaluated by a Tensile Hysteresis Test (ASTMD-412), a common technique used to evaluate the elastic properties of elastomers. The test procedure is as follows:

1. Mount a 1" wide, 0.5 to 1 mil thick film on an Instron tension meter with a gauge length set for 2 inches.
2. Stretch the film on the Instron to 25% elongation, then allow the film to snap back by returning the Instron crosshead to its original position until the load cell reads zero.
3. Measure the unrecoverable strain and calculate the percent film recovery at 25% film elongation.
4. Repeat the experiment at 50% film elongation to measure the percent film recovery at 50% film elongation.

Film sample 1 is made from copolymer sample substantially linear ethylene-1, film sample 2 from Substantially Linear Ethylene-2, film sample 3 from substantially linear ethylene-3, and film sample 4 from substantially linear ethylene-4. Comparative film sample 1A is made from copolymer sample LLDPE-1, comparative film sample 2A from LLDPE-2, comparative film sample 3A from LLDPE-3, and comparative film sample 4A from LLDPE-4.

Figure 2:
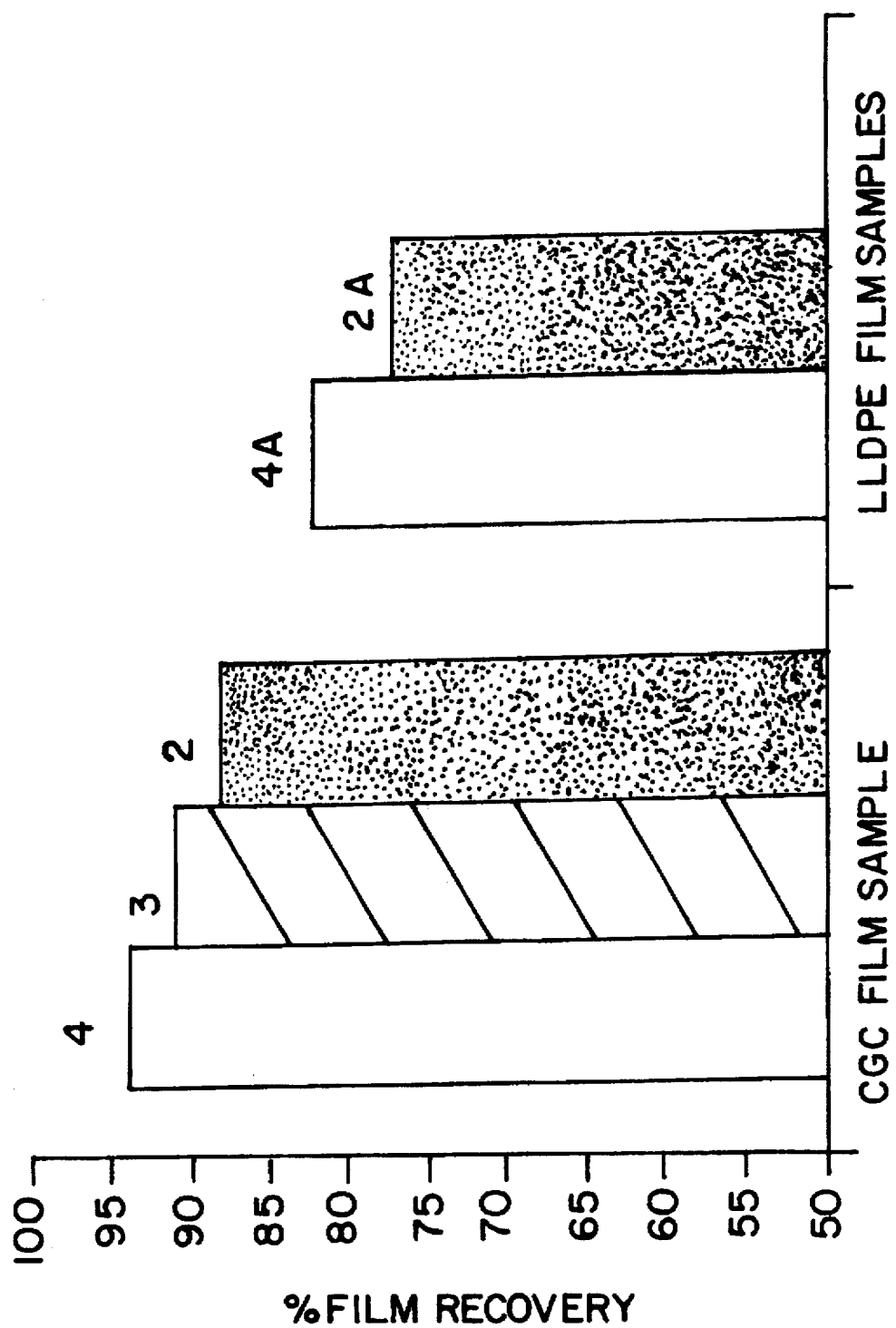

The percent recovery for samples 1–4 and 1A–4A at 50% film elongation and 25% film elongation are illustrated in FIGS. 1 and 2, respectively. The data in these figures suggests that films made from lower density resins have better elastic recovery than films made from higher density resins, and it clearly shows that the films made from the substantially linear ethylene polymers have a better elastic recovery than the conventional LLDPE films. For example, film sample 3 (substantially linear ethylene-3, density of 0.902 g/cm³) exhibits a better elastic recovery (88% at 50% elongation) even when compared with a lower density (0.900 g/cm³) LLDPE film such as film sample 4A (80% at 50% elongation).

EXAMPLE 2

Comparison of the Elastic Recovery Properties of substantially linear ethylene Film and Various Commercial Meat Wrap Film Products The Elastic Recovery Property of film sample 3 is compared to the following four commercially available meat wrap film products:

1. PVC meat wrap film manufactured by Borden Inc.
2. EVA-based film manufactured by Mitsubishi Petrochemical Co. of Japan, and sold under the trademark YUKA WRAP.
3. EVA-based film manufactured by Asahi Chemical Co. of Japan, and sold under the trademark SUNTEC C-100.
4. EVA/EP elastomer based film manufactured by Asahi Chemical Co. of Japan, and sold under the trademark SUNTEC C-400.

Figure 3:
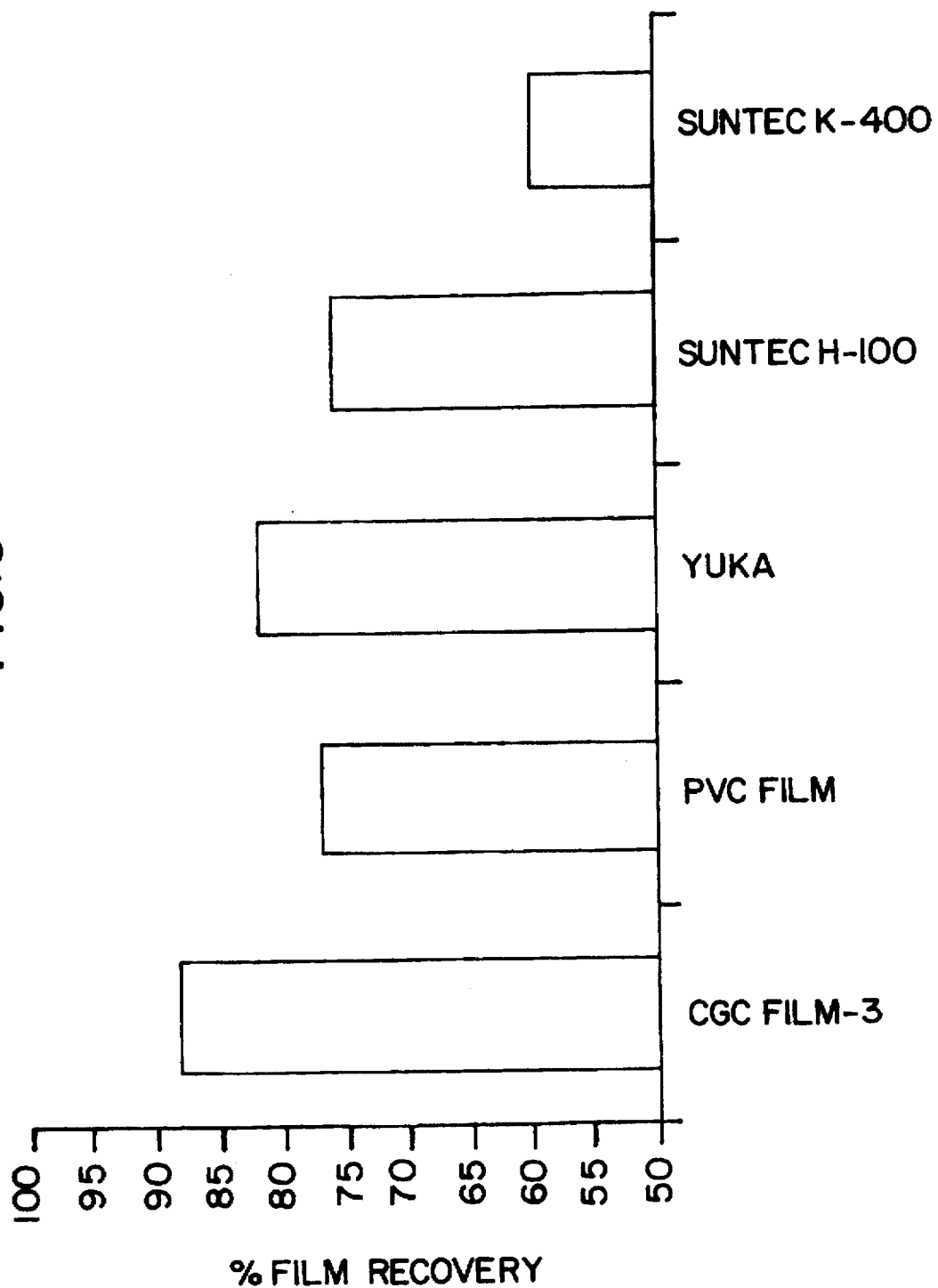
FIGS. 3 and 4 report the comparative percent recovery of certain other films at 50 and 25% film elongation, respectively.
Figure 4:
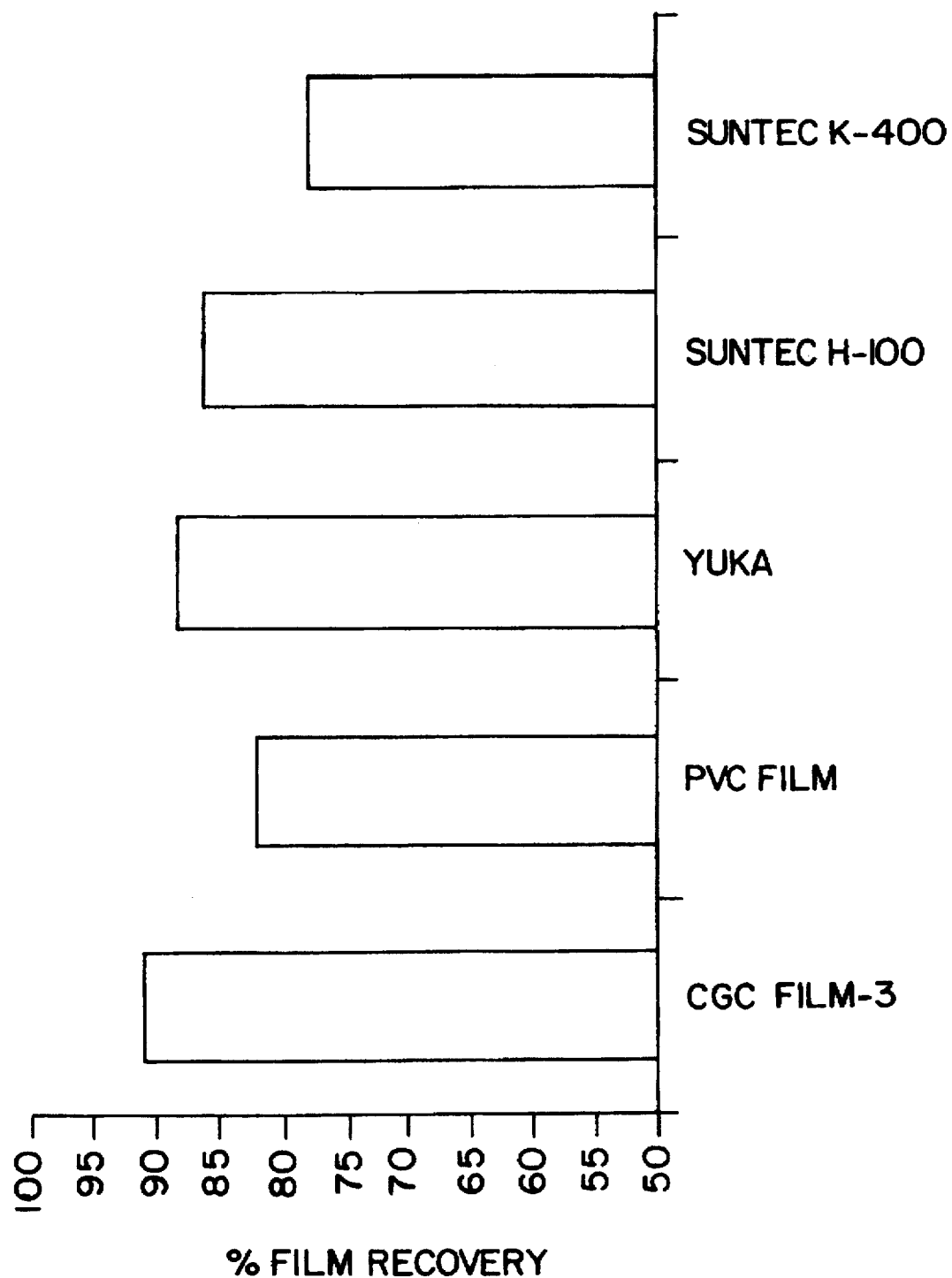

The recovery properties of these films at 50% and 25% elongation are summarized in FIGS. 3 and 4, respectively. The data in these figures clearly show that film sample 3 has the best film recovery property at both 50% and 25% film elongation.

EXAMPLE 3

Comparison of the Heat Seal Properties of substantially linear ethylene Film and Various Commercial Meat Wrap Film Products Film samples 5 and 6 are fabricated from substantially linear ethylene-5 and substantially linear ethylene-6, respectively, in the same manner in which film samples 1–4 are fabricated. The heat seal properties, an important property in stretch overwrap, shrink packaging and vacuum form packaging applications, of these two film samples are compared against those of the commercial wraps described in Example 2, above. The heat seal properties of all these films are measured on a Dynaweb Heat Seal Machine manufactured by Dynaweb Inc. of Sunnyvale, Calif. The conditions of the tests are those described in ASTM E 171–82. The results are reported in FIG. 5, and these results clearly show that the heat seal properties of film samples 5 and 6 are superior to those of the commercially available meat wraps (i.e. lower heat seal initiation temperature and higher seal strength).

EXAMPLE 4

Comparison of the Heat Seal Properties of Substantially Linear Ethylene Film and LLDPE Film The heat seal properties of film samples 2 and 3 are compared against those of comparative film samples 3A and 4A. The data is reported in FIG. 6, and it clearly shows that the substantially linear ethylene film samples exhibit superior heat seal properties to those of the LLDPE film samples. For example, film sample 3 (substantially linear ethylene-2, density of 0.902 g/cm³) has a lower heat seal initiation temperature and a higher heat seal strength than that of comparative samples 3A and 4A.

EXAMPLE 5

In-store Comparison of a Substantially Linear Ethylene Film with a Commercial Meat Wrap Film Various meat products are packaged by a retail grocer using both PVC Meat Wrap Film from Borden Inc. and substantially linear ethylene film made from substantially linear ethylene-3 according to the method described above.

The substantially linear ethylene film performance is comparable to the PVC film performance in all respects without possessing any of the known disadvantages of PVC, such as the generation of corrosive acid when heat sealed or incinerated for disposal, recycle stream incompatibility, etc.

EXAMPLE 6

Comparison of Oxygen Transmission Rates of Two Substantially Linear Ethylene Films and Commercial PVC Meat Wrap Film The oxygen transmission rates of substantially linear ethylene-2 and substantially linear ethylene-3 film (1 mil thick) and two commercial PVC meat wrap films are measured with a gas transmission measuring instrument (Model 1050A manufactured by Mocon Inc. of Minnesota). The test film is stored under a nitrogen atmosphere for 24 hours to condition it for the test. The film is then mounted onto a gas transmission cell in a standard fashion. A standard gas mixture of 3 wt % oxygen and 97 wt % nitrogen is used to measure the oxygen transmission rate at 24° C. at 70% relative humidity. The results are summarized Table 3.

TABLE 3

OXYGEN TRANSMISSION RATES OF VARIOUS PVC AND SUBSTANTIALLY LINEAR ETHYLENE FILMS

| Film | Film Thickness (mil) | $O_2$ Transmission ($cm^3/100\ in^2/day/atm$) |
|---|---|---|
| substantially linear ethylene-2 | 1 | 550 |
| substantially linear ethylene-3 | 1 | 850 |
| PVC | 0.6 | 750 |
| PVC | 1 | 430 |

As the results reported in Table 3 show, at comparable thicknesses, the substantially linear ethylene films transmit more oxygen than does either commercial PVC film. Film with high oxygen transmission is very desirable for red meat packaging because under similar circumstances, the meat will more effectively bloom to the desired bright red color than meat packaged in a relatively low oxygen transmission film (in which the color of the meat tends to turn brown). Surprisingly, films of this invention typically show oxygen transmission at least about 20% higher than films made from comparative heterogeneous ethylene/α-olefin polymers using the same comonomer and at the same or substantially the same $I_2$ and density.

EXAMPLE 7

Meat Storage Tests

Figures 7A, 7B:
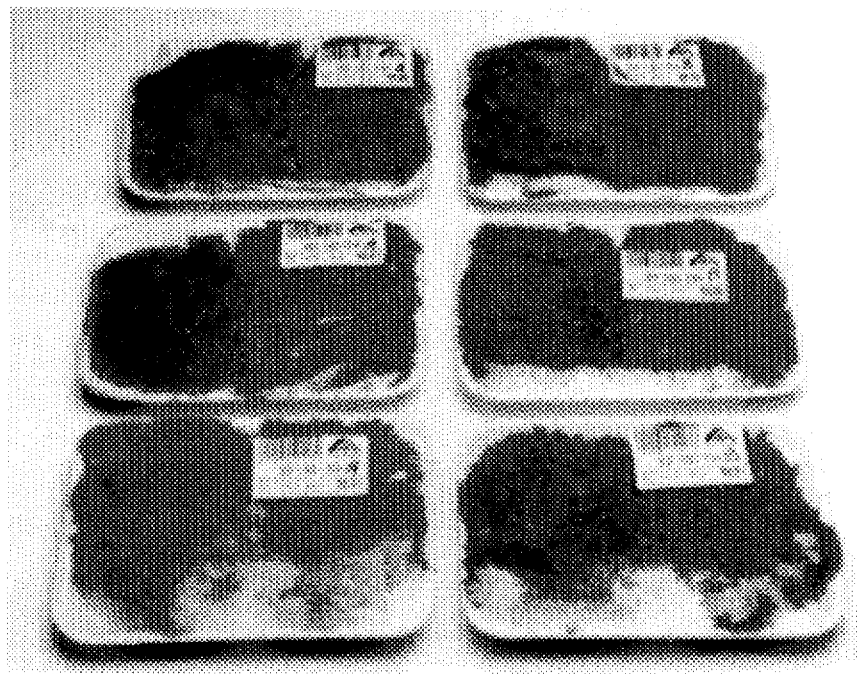
FIG. 7 is a photograph showing the color of six retail-cut red meat samples after 14 days of storage in a freezer. All the samples were packaged using a stretch overwrap method, three samples packaged in PVC film and three samples packaged in a film of this invention.

Various retail-cut red meat products are packaged with PVC films and films made from substantially linear ethylene-2 and substantially linear ethylene-3 (Example 5), and are then stored in a deep freezer for 14 days. The color of the meat samples packaged in the substantially linear ethylene film (those labeled A in FIG. 7) is indistinguishable from the color of the meat samples packaged in the PVC film (those labeled B in FIG. 7). All the meat samples retain their red, fresh looking color.

EXAMPLE 8

Multilayer Films

Five three-layer films are prepared by flat dye extrusion at a melt temperature between 240 and 280 C. at a line speed of 150 m/min. The total thickness of each film is between 14 and 16 μm. The thickness of the core layer is about 7 to 8 μm, and the thickness of each surface or skin layer is about 4 μm. Each film is of the structure A/B/A with a weight percentage of 25/50/25. Film layers A and B are varied throughout the following experiments.

The linear low density polyethylene (LLDPE) of these films has a nominal content of copolymerized 1-octene of 7 to 8 wt %, a melt index of 2.3 g/10 min, and a density of 0.917 g/cm$^3$. The ethylene/acrylic acid copolymer (EAA) contains about 9 wt % copolymerized acrylic acid, and has a melt index of 1.5 g/10 min and a density of 0.938 g/cm$^3$. The low density polyethylene (LDPE) homopolymer of ethylene is manufactured by conventional high pressure free radical polymerization, and has a melt index of 1.7 g/10 min and a density of 0.923 g/cm$^3$. The substantially linear ethylene polymer is similar to that of substantially linear ethylene-3 in Table 1.

Various physical properties of the films of this Example are reported below in Table 4. Two numbers are reported for each property of each film. The first number is the measurement, and the second number is the standard deviations for that measurement.

The recovery property is measured using a tensile test machine JJ Type T 500 equipped with a probe of 12.5 mm diameter having a hemispherical tip of polytetrafluoroethylene. A film sample is positioned with a clamping ring having an inner diameter of 125 mm. The probe is lowered until it just touches the film sample (the starting position). The probe is then further lowered to a depth of 25 mm at a rate of 100 mm/min which results in the deformation of the sample. A force/deflection curve is then recorded with the deflection on the x-axis.

The probe is then withdrawn from the film sample at a rate of 100 mm/min until it reaches its starting position. One minute after the withdrawal of the probe has commenced, the probe is relowered at the same rate to the same depth and a second force/deflection curve is recorded. The separation of the first and the second curve on the x-axis is due to the additional movement of the probe to contact the surface of the film that has not entirely recovered after the first deflection of 25 mm. The distance "x" between the two curves is always measured at a force of 1 Newton. From the distance x between the two curves the actual difference between the movement of the probe in the second run and in the first run is determined and the recovery in percent is calculated based on this difference and on the total deflection (25 mm).

The Puncture Force is measured in Newtons on an Instron Tensiometer equipped with an integrator unit. Crosshead and chart speeds are set for 10 inches per minute. The film samples are 6 inch by 6 inch squares, and the film thickness is measured and recorded prior to each test.

The Elmendorf tear strength is measured in grams according to ASTM D-1922. "MD" means machine direction, and "CD" means cross direction.

TABLE 4

PHYSICAL PROPERTIES OF VARIOUS MULTILAYER FILMS

| Film Physical Property (unit) | LLDPE/ EAA/ LLDPE/ | LLDPE/ substantially linear ethylene/ LLDPE | substantially linear ethylene/ LDPE/ substantially linear ethylene | substantially linear ethylene/ EAA substantially linear ethylene | LLDPE/ LDPE/ LLDPE |
|---|---|---|---|---|---|
| Recovery (%) | 86.4/1.6 | 86.6/0.46 | 82.9/1.66 | 87.0/0.99 | 79.1/0.72 |
| Puncture Force/In (N) | 21.7/1.67 | 23.6/2.35 | 20.1/0.85 | 24.9/1.9 | 19.8/1.6 |
| Puncture Force/Out (N) | 24.5/1.48 | 23.8/4.5 | 19.8/1.1 | 24.7/4 | 21.1/0.7 |
| Elmendor MD (G) | 130.6/2.64 | 191.2/6.4 | 75/7.4 | 168/33.2 | 69.4/7.4 |
| Elmendor CD (G) | 61.2/7.2 | 298/6.4 | 57.6/6.6 | 45.8/6.7 | 52/4.2 |

In the context of commercial meat wrapping applications, a recovery of 85% or greater is considered desirable. In actual wrapping tests, the LLDPE/substantially linear ethylene/LLDPE and substantially linear ethylene/EAA/ substantially linear ethylene films performed to commercial standards with respect to handling and compatibility with conventional wrapping equipment.

EXAMPLE 9

Cold Fog Test

Five cast coextruded film structures of 15 micron thickness and having an A/B/A layer distribution of 15%—70%—15% are produced on a cast film line at a line speed of 150 m/min. The composition of each film structure is as follows:

| Film Number | Film Composition |
|---|---|
| 1 | LDPE/substantially linear ethylene/LLDPE |
| 2 | LDPE/substantially linear ethylene/LLDPE plus 1% Atmer ® 7944 in each layer |
| 3 | LDPE/substantially linear ethylene/LLDPE plus 0.1% slip additive erucamide in each layer |
| 4 | LDPE/substantially linear ethylene/LLDPE plus 1% Atmer ® 7944 and 0.1% slip additive erucamide in each layer |
| 5 | LLDPE/EAA/LLDPE plus 1% Atmer ® 7944 in each layer |

Atmer® 7944 is an antifogging agent manufactured and sold by ICI Chemicals, and is an alkoxylated alkylphenol along with or in combination with a mixed mono-, di-or/and triglyceride or a polyoxyalkylene fatty acid ester or a combination of the two. These films are used to package boiled red beets in polystyrene trays with dimensions of 130 mm×130 mm×30 mm using a Delford SP-800 "flow tack" type stretch wrapper which is controlled by a microprocessor. Temperature settings are ambient for the roll seal and 210° C. for the heat board. A rotating blade knife is used to cut the film.

The first four films (those with a substantially linear ethylene core layer) demonstrate good stretching in the cross direction without tearing in the machine direction. Film 5 (the film with an EAA core layer) demonstrates some tearing in the machine direction close to the film grips. The sealing performance of all films is excellent, and all are handled relatively well by the wrapper apparatus, i.e. approximately 62 to 64 trays per minute are packaged.

The antifogging properties of each film is tested by fastening a sample of each film over a 250 mil beaker containing 200 mm water at 40° C. The beaker is then placed in a temperature control cabinet at 4° C., and observations of the film are taken at various intervals. The results are reported in Table 5.

TABLE 5

ANTIFOG PROPERTIES OF VARIOUS MULTILAYER FILMS

| Film No. | Appearance after Minutes | | | | | Hours | | | | Days | | | | |
|---|---|---|---|---|---|---|---|---|---|---|---|---|---|---|
| | 1 | 5 | 10 | 20 | 30 | 1 | 2 | 3 | 6 | 1 | 2 | 3 | 4 | 7 |
| No. 1 | A | A | A | A | A | A | A | A | A | A | A | A | A | A |
| No. 2 | D– | D+ | D | D | D | D+ | D+ | D+ | D+ | D–E | D–E | D–E | D–E | D–E |
| No. 3 | A+ | A | A | A | A | A | A | A | A | A | A | A | A | A |
| No. 4 | A+ | A–B | B | C | D– | D | D | D | D | D–E | D–E | D–E | D–E | D–E |
| No. 5 | A | A | B | B | D+ | B+ | C | C | C | C | C | C | C | C |

TABLE 5-continued

ANTIFOG PROPERTIES OF VARIOUS MULTILAYER FILMS

| Description: | Performance | Ratings | Comments |
|---|---|---|---|
| An opaque layer of small fog droplets | Very poor | A | Zero visibility, poor light trans. |
| An opaque or trans. layer of large droplets | Poor light trans. | B | Zero visibility, poor |
| A complete layer of large droplets | Poor effect | C | Poor visibility, dripping |
| Randomly scattered or large trans. droplets water | Good | D | Discontinuous film of |
| A trans. film showing no visible water | Excellent | E | Completetly trans. |

The comparison of the results of films 1 and 3 with film 2 demonstrates the need and positive effect of using an antifogging additive. Film 4 shows that over time, an antifogging additive works well even in the presence of a slip additive. Film 5 demonstrates that the presence of a polar, hydrophilic core layer is detrimental to the performance of a conventional antifogging additive.

Although the invention has been described in considerable detail through the preceding examples, this detail is for illustration purposes only, and it is not to be construed as a limitation on the spirit and scope of the invention as described in the following claims.

What is claimed is:

1. A method for packaging food, the method comprising wrapping the food in a film structure having at least one film layer comprising a blend of (A) a substantially linear ethylene polymer characterized as having:

(i) a melt flow ratio, $I_{10}/I_2, \geq 5.63$; and (ii) a molecular weight distribution, $M_w/M_n$, defined by the equation:

$$M_w/M_n \leq (I_{10}/I_2) - 4.63;$$

and (iii) a density greater than 0.85 g/cm$^3$;

and (B) at least one other polymer.

2. The method of claim 1 in which the other polymer of (B) is a substantially linear ethylene polymer which differs from polymer of part (A).

3. The method of claim 1 in which the substantially linear ethylene polymer is blended with a conventional homogeneously branched or heterogeneously branched ethylene polymer.

4. The method of claim 1 in which the substantially linear ethylene polymer is blended with a $\alpha,\beta$-ethylenically unsaturated carbonyl copolymer.

5. The method of any of claims 2–4 in which the first substantially linear ethylene polymer comprises between about 90 and about 75 weight percent ethylene, and between 10 and about 25 weight percent of at least one $\alpha$-olefin comonomer.

6. The method of claim 5 in which the $\alpha$-olefin contains 3 to about 20 carbon atoms.

7. The method of claim 5 in which the $\alpha$-olefin is at least one selected from the group consisting of propylene, 1-butene, 1-hexene, 4-methyl-1-pentene, 1-heptene and 1-octene.

8. The method of claim 7 in which the first substantially linear ethylene polymer is characterized as having:

(i) a melt flow ratio from about 6.5 to 15;

(ii) a molecular weight distribution between about 1.5 and 2.5; and (iii) a density between about 0.870 to about 0.910 g/cm$^3$.

9. The method of claim 7 in which the first substantially linear ethylene polymer comprises at least about 50 weight percent of the blend.

10. The method of claim 7 in which the first substantially linear ethylene polymer comprises at least about 75 weight percent of the blend.

* * * * *